3,064,013
STEROIDAL 11-OXIMES AND A PROCESS FOR THEIR PRODUCTION
John C. Babcock, Portage Township, Kalamazoo County, and J Allan Campbell, Kalamazoo Township, Kalamazoo County, Mich., assignors to The Upjohn Company, Kalamazoo, Mich., a corporation of Delaware
No Drawing. Filed Jan. 12, 1959, Ser. No. 786,057
17 Claims. (Cl. 260—397.3)

This invention relates to certain novel steroids, more particularly to certain 11-oximido steroids and to a process for their production. These steroids include (1) those represented by the following formulae:

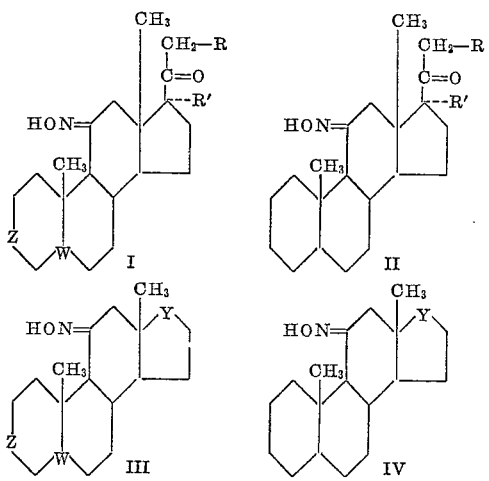

wherein R is hydrogen, hydroxy or acyloxy; R' is hydrogen or hydroxy; W is a single or double bonded $C_5$ carbon atom, i.e., 4(5) when Z is carbonyl and 5(6) when Z is hydroxymethylene or acyloxymethylene; Y is carbonyl, β-hydroxymethylene, β-acyloxymethylene, β-hydroxy-α-methylmethylene or β-acyloxy-α-methylmethylene, and Z is carbonyl, hydroxymethylene and acyloxymethylene, acyloxy is preferably lower-acyloxy, e.g., hydrocarbon-acyloxy containing from one to 12 carbon atoms, inclusive, and (2) the $\Delta^{1,4}$ steroids otherwise corresponding to Formula I or III when Z is carbonyl.

Oximes of steroids other than 11-ketosteroids are known. See, e.g., U.S. 2,806,028. It was heretofore believed that the inertness of an 11-keto group would prevent the formation of an oxime. We have now found that under forcing conditions, the 11-oxime is, in fact, formed thus producing a new class of steroids.

The 11-oximido steroids of this invention are pharmacologically active compounds. They possess antifungal, central nervous system regulating, hormone potentiating, pituitary inhibiting, sleep potentiating, hypotensive, and water and salt regulating activities. The 3-desoxy compounds of this invention are of particular interest as the 3-oxygen function in other types of compounds is generally regarded as essential to activity.

For administration to the animal organism, the compounds of this invention can be mixed, if desired, with pharmaceutical diluents, and produced in conventional dosage forms, e.g., solutions and suspensions or other liquid forms which are adaptable for injectable products or pills, tablets, capsules, syrups or elixirs for oral use.

The compounds of this invention can be acylated to produce 11-acyloxyoximido esters by reaction with an acylating agent, e.g., an anhydride or acid halide of a hydrocarbon carboxylic acid, preferably a lower-hydrocarbon carboxylic acid, e.g., formic, acetic, propionic, β-cyclopentylpropionic, octanoic, triethylacetic, trimethylacetic or succinic acid.

11-oximido steroids are useful in the production of the corresponding 11-primary amino compounds. These latter compounds possess pharmacological activity, including central nervous system regulatory properties, antibacterial, antihormonal and salt and water regulating activity, pituitary inhibiting, anti-inflammatory, and other valuable pharmacological activities. These 11-amino compounds can be alkylated or di-alkylated to produce a mono-alkyl, e.g., methyl, or dialkyl, e.g., dimethyl, substituted 11-amino steroid, which latter compounds also possess the pharmacological properties described above.

In carrying out the process of this invention, an 11-ketosteroid is reacted with hydroxylamine or an acid addition salt thereof, preferably at least a chemical equivalent and preferably in a basic solvent, e.g., pyridine, at temperatures substantially above room temperature, preferably from about 80–120° C., until the 11-keto group is substantially completely reacted, as evidenced by a loss of infrared absorption in the area characteristic of an 11-keto group, e.g., several hours at refluxing temperature. If the starting steroid is a polyketo steroid or a functional derivative thereof which is removable under the reaction conditions, all of the keto groups will be converted to oximido groups under these conditions. A compound of this invention is prepared from these polyoximido steroids by selective hydrolysis or exchange of the oximido groups other than the 11-oximido group, e.g., with an active carbonyl compound, i.e., a carbonyl compound of sufficient reactivity to undergo exchange reactions with basic ketonic derivatives in the usual manner, e.g., pyruvic acid, pyruvaldehyde, glyoxal, glyoxylic acid, diacetyl, benzaldehyde, phenylglyoxalic acid, formalin, p-aminobenzaldehyde, etc., in a manner similar to that for hydrolysis of semicarbazides of ketosteroids. See, e.g., Hershberg, J. Org. Chem., 13, 542 (1948); Mattox and Kendall, J. Am. Chem. Soc., 70, 882 (1948) and U.S. 2,447,463, for operable methods. Usually elevated temperatures, e.g., 40° C. or above, are employed although temperatures of 20–40° C. are also satisfactory.

The oximation reaction can be conducted in an essentially neutral solvent, e.g., benzene, toluene, tetrahydrofuran, dioxane, ethylene glycol, ethanol, propanol, tertiary butyl alcohol, and the like, or in a basic solvent, e.g., pyridine, picoline, collidine, and the like. The reaction is preferably conducted with an acid addition salt of hydroxylamine, e.g., hydrochloride, sulfate, acetate. As is apparent to those skilled in the art, strongly acidic conditions are less desirable as they hinder the oxime formation. The solvent is preferably high enough boiling so that pressure equipment is not required at the reaction temperature employed although pressure conditions are operable. The standard conditions and reagents for the formation of an oxime are employed, except that the reaction is conducted at higher temperatures and preferably longer reaction times.

Isolation and purification of the desired reaction product can be by conventional means, e.g., fractional crystallization or chromatography over activated charcoal, alumina or magnesium silicate. Polyoximes can be separated from less completely oximated products by extraction with acid or base and neutralization of the resulting extracts.

The following preparations and examples are illustrative of the process and products of the present invention, but are not to be construed as limiting.

PREPARATION 1

*11β-Hydroxy-5α- and 5β-Androstane-3,17-Dione*

20 g. of 11β-hydroxy-4-androstene-3,17-dione was dissolved in 300 ml. of methanol and then hydrogenated on a Parr apparatus in the presence of 0.17 g. of 5 percent Pd-C catalyst. After the pressure became constant the catalyst was removed by filtration. The filtrates from three like hydrogenations were combined with this filtrate and the solvent removed, leaving a residue of a mixture of the 5α- and 5β-isomers of 11β-hydroxyandrostane-3,17-dione.

The residue was dissolved in 450 ml. of boiling acetone and 90 ml. of pyrrolidine was added. About 100 ml. of solvent was distilled and then 450 ml. of methanol was added. The solution was boiled until a boiling point of 64° C. was reached and then chilled and the resulting precipitate filtered. There was thus obtained crystalline 11β-hydroxy-5α-androstane-3,17-dione 3-pyrrolidyl enamine which was dissolved in 275 ml. of cold 3 N hydrochloric acid and then filtered through diatomaceous earth. To the filtrate was slowly added with cooling 600 ml. of 5 percent sodium hydroxide. The precipitated steroid was filtered, washed with water, very dilute hydrochloric acid, water and then dried to give 23.9 g. of 11β-hydroxy-5α-androstane-3,17-dione melting at 220–224° C. Recrystallization from a mixture of acetone and ethyl acetate raised the melting point to 225–228° C.

The filtrate, obtained when the 11β-hydroxy-5α-androstane-3,17-dione 3-pyrrolidyl enamine was separated by filtration, was concentrated to give a precipitate of 11β-hydroxy-5β-androstane-3,17-dione 3-pyrrolidyl enamine, M.P. 140–170° C., which was hydroylzed and then recrystallized in the manner described above for the 5α-isomer to give 11β-hydroxy-5β-androstane-3,17-dione melting at 208–213° C.

PREPARATION 2

*17β-Hydroxy-5α-Androstane-3,11-Dione*

To a solution of 5.0 g. of 11β-hydroxy-5α-androstane-3,17-dione 3-pyrrolidyl enamine, prepared in the manner described in Preparation 1, in 170 ml. of tetrahydrofuran was added 2.5 g. of lithium aluminum hydride with stirring and cooling in an ice bath. After stirring for 2 hours at about 0° C., the excess lithium aluminum hydride was decomposed with ethyl acetate. Water was then added under a stream of nitrogen. The solution was acidified with hydrochloric acid, basified with sodium hydroxide and again acidified with hydrochloric acid. This resulted in the hydrolysis of an enamine group. A precipitate was obtained which was washed with dilute hydrochloric acid, water and then dried to give 4.0 g. of 11β,17β-dihydroxy-5α-androstan-3-one melting at 268–271° C.

A mixture of 4.0 g. of 11β,17β-dihydroxy-5α-androstan-3-one, 15 ml. of tetrahydrofuran, 10 ml. of pyridine and 6 ml. of acetic anhydride was warmed to 50° C. and then maintained overnight at room temperature. The solution was warmed and then filtered through diatomaceous earth. Water was slowly added to the filtrate until a total volume of 100 ml. was obtained. The precipitated 11β,17β-dihydroxy-5α-androstan-3-one 17-acetate was filtered, washed with water and dried to give 3.95 g. of crystals melting at 196–203° C. Recrystallization from ethyl acetate raised the melting point to 197–203° C.

To a solution of 2.3 g. of 11β,17β-dihydroxy-5α-androstan-3-one 17-acetate in 50 ml. of acetic acid was added, with stirring and cooling, a solution of 1.0 g. of chromium trioxide in 2 ml. of water and 5 ml. of acetic acid. The ice-bath was removed and after 0.5 hour, 10 ml. of methanol was added. The solution was concentrated to 15 ml. at reduced pressure at below 25° C. Water was added and the precipitated 17β-hydroxy-5α-androstane-3,11-dione 17-acetate was filtered, washed with water and dried to give 1.8 g. of crystals melting at 155–159° C. Recrystallization from acetone raised the melting point to 156–158° C.

A solution of 1.1 g. of 17β-hydroxy-5α-androstane-3,11-dione 17-acetate in 50 ml. of 80 percent methanol containing 5 percent potassium carbonate was refluxed for 5 hours. The solution was concentrated to about 15 ml. and diluted with water to give 0.85 g. of 17β-hydroxy-5α-androstane-3,11-dione melting at 191–195° C.

Following the procedure of Preparation 2, but substituting 11β-hydroxy-5β-androstane-3,17-dione 3-pyrrolidyl enamine as the starting steroid there was thus produced 17β-hydroxy-5β-androstane-3,11-dione.

PREPARATION 3

*17β-Hydroxy-17α-Methyl-5α-Androstane-3,11-Dione*

To a solution of 4.0 g. of 11β-hydroxy-5α-androstane-3,17-dione 3-pyrrolidyl enamine, prepared in the manner described in Preparation 1, in 150 ml. of tetrahydrofuran which had been freshly distilled from lithium aluminum hydride, was added under nitrogen 35 ml. of a 4 N solution of methyl magnesium bromide in ether. The solution was distilled until the boiling point reached 62° C. and then refluxed for 26 hours. The solution was poured into ice and dilute hydrochloric acid with stirring. The solution was then basified with sodium hydroxide, thus hydrolyzing the enamine. The mixture was reacidified and the precipitated steroid was filtered, washed with water and dried to give 2.7 g. of 11β,17β-dihydroxy-17α-methyl-5α-androstan-3-one melting at 230–238° C. Recrystallization from benzene raised the melting point to 237–239° C.

1 g. of 11β,17β-dihydroxy-17α-methyl-5α-androstan-3-one dissolved in 30 ml. of acetic acid was mixed with a solution of 0.8 g. of chromic anhydride in 3 ml. of water. After 5 hours, 10 ml. of methanol was added and the solution distilled to a small volume at reduced pressure. The residue was diluted with 50 ml. of water, cooled, and the precipitate filtered, washed with water and dried to give 17β-hydroxy-17α-methyl-5α-androstane-3,11-dione which, after crystallization from a mixture of acetone and water, was obtained as plates melting with decomposition above 210° C., $[\alpha]_D$ +56° ($CHCl_3$).

Following the procedure of Preparation 3, but substituting 11β-hydroxy-5β-androstane-3,17-dione as the starting steroid, there was thus produced 17β-hydroxy-17α-methyl-5β-androstane-3,11-dione.

PREPARATION 4

*3β,17β-Dihydroxy-5α-Androstan-11-One*

To a solution of 1 g. of 17β-hydroxy-5α-androstane-3,11-dione in 25 ml. of isopropyl alcohol was added 0.5 g. of sodium borohydride in 2 ml. of isopropyl alcohol and 0.2 ml. of 1 N sodium hydroxide. The solution was stirred for one hour at 20–30° C. and then slowly diluted with water. The precipitated 3β,17β-dihydroxy-5α-androstan-11-one was filtered, washed with water, dried and recrystallized from aqueous methanol.

Similarly, 17β-hydroxy-5β-androstane-3,11-dione, 17β-hydroxy-17α-methyl-5α-androstane-3,11-dione and 17β-hydroxy-17α-methyl-5β-androstane-3,11-dione were reduced to 3α,17β-dihydroxy-5β-androstan-11-one, 3β,17β-dihydroxy-17α-methyl-5α-androstan-11-one and 3α,17β-dihydroxy-17α-methyl-5β-androstan-11-one, respectively.

PREPARATION 5

*17β-Hydroxy-17α-Methyl-5α-Androstan-11-One*

A solution of 1 g. of chromic anhydride in 2 ml. of water and 4 ml. of acetic acid followed by 5 ml. acetic acid was added to 2 g. of 17α-methyl-5α-androstane-11β,17β-diol (S. N. 523,390) in 30 ml. of acetic acid. The mixture was maintained at room temperature for one hour and then diluted with 5–10 ml. of methanol followed by a large volume of water. There was obtained a precipitate of 17β-hydroxy-17α-methyl-5α-androstan-11-one which, after washing with water and drying, melted at 125–128° C. Recrystallization from methanol and water gave a polymorphic form which melted at 157–159° C.

PREPARATION 6

*5β-Pregnane-11,20-Dione*

To 3 g. of 5β-pregnane-3,11,20-trione in 5 ml. of methylene chloride and 7.5 ml. of methanol was added a was converted to the bisoxime and then hydrolyzed to the 11-mono-oxime.

Following the procedures of Examples 1 and 2, 11-keto-17α-hydroxyprogesterone was converted to 11-keto-17α-hydroxyprogresterone trisoxime and then hydrolyzed to the 11-mono-oxime, 11-keto-21-hydroxyprogesterone was converted to 11-keto-21-hydroxyprogesterone trisoxime and then hydrolyzed to the 11-mono-oxime.

EXAMPLE 6
Cortisone 11-Oxime

Following the procedures of Examples 1 and 2, cortisone was converted to cortisone trisoxime and then hydrolyzed to the 11-mono-oxime.

Similarly, 6α-methylcortisone was converted to 6α-methylcortisone trisoxime and then hydrolyzed to the 11-mono-oxime, 6α-methylprednisone was converted to 6α-methylprednisone trisoxime and then hydrolyzed to the 11-mono-oxime and 2α-methylcortisone was converted to 2α-methylcortisone trisoxime and then hydrolyzed to the 11-mono-oxime, prednisone was converted to prednisone trisoxime and then hydrolyzed to prednisone 11-oxime, 1-dehydro-11-ketoprogesterone was converted to 1-dehydro-11-ketoprogresterone trisoxime and then hydrolyzed to 1-dehydro-11-ketoprogesterone 11-oxime.

EXAMPLE 7
3α,20-Dihydroxy-5β-Pregnan-11-One 11-Oxime

A solution of 200 g. of 3α,20β-dihydroxy-5β-pregnan-11-one, 200 g. of hydroxylamine hydrochloride and one liter of pyridine was refluxed under nitrogen for 5 hours. To the resulting clear solution was added about 630 ml. of water. There was produced a solid mass of crystals. An additional 1,450 ml. of water was added, the mixture chilled, filtered and the filter cake washed with water, dilute hydrochloric acid and again with water and the washed crystals then dried to give 222 g. of 3α,20-dihydroxy-5β-pregnan-11-one subliming into plates at 210° C. and melting at 222–227° C.

4 g. of the thus-obtained crystals were heated in 8 ml. of pyridine and 6 ml. of acetic anhydride to 60° C. until the starting material dissolved. The solution was maintained at room temperature for 2 hours and then quenched with water. There precipitated from the mixture 3α,20-dihydroxy-5β-pregnan-11-one 11-oximidoacetate, 3,20-diacetate melting at 225–230° C. with sintering at 210° C. The melting point was depressed to 194° C. on admixture with the starting oxime.

A solution of 0.5 g. of 3α,20-dihydroxy-5β-pregnan-11-one 11-oximidoacetate, 3,20-diacetate and one drop of boron trifluoride etherate in 10 ml. of methylene chloride and 10 ml. of methanol was refluxed for about 2 hours and then distilled to remove the methylene chloride. The concentrate was diluted with water and then chilled to give a precipitate which was separated by filtration, washed with dilute methanol and dried. 0.4 g. of thus-obtained precipitate was refluxed in a mixture of ether and hexanes to give a precipitate of a solvate of 3α,20-dihydroxy-5β-pregnan-11-one 11-oxime 3,20-diacetate as plates which partly melted at 99° C. with more complete melting at 142–150° C. Further crystallization yields the pure product.

EXAMPLE 8
5α-Pregnane-11,20-Dione Bisoxime

A solution of 0.5 g. of 5α-pregnane-11,20-dione (S.N. 523,390, now Patent No. 2,881,188) and 2 g. of hydroxylamine hydrochloride in 25 ml. of ethanol containing a trace of potassium hydroxide was heated near the reflux temperature. Then 3.1 g. of potassium hydroxide in 4 ml. of water was added and heating was continued for 3 hours. There was obtained 0.55 g. of a mixture subliming at 155° C. to needles, which melted at 180° C., plus denser crystals melting at 261–269° C. Fractional crystallization from a mixture of ether and hexanes gave 300 mg. of 5α-pregnane-11,20-dione bisoxime as triangular prisms melting at 261-262° C., $\nu_{max}$. 3280, 1703, 1652 cm.$^{-1}$ and having the analysis below.

Calcd. for $C_{21}H_{34}N_2O_2$: C, 72.79; H, 9.89; N, 8.09. Found: C, 72.73; H, 10.07; N, 7.99.

The more soluble component of the above-described mixture was 5α-pregnane-11,20-dione 20-oxime which melts, when pure, at 181 to 185° C. It is a sleep potentiator, i.e., increases the duration of sleep produced by a standard dose of Evipal.

EXAMPLE 9
5α-Pregnane-11,20-Dione 11-Oxime

A mixture of 200 mg. of 5α-pregnane-11,20-dione bisoxime, 5 ml. of acetic acid, 2.5 ml. of water and 0.4 ml. of pyruvic acid was stirred with warming on a steam bath under nitrogen for 15 minutes. Another 2.5 ml. of water was then added and gentle heating was continued for 3 hours. The reaction mixture was cooled and diluted with 10 ml. of water. The resulting precipitate was collected on a filter, washed with water and dried to give 5α-pregnane-11,20-dione 11-oxime.

Similarly, 5β-pregnane-11,20-dione was converted to is 11,20-bisoxime and then to its 11-mono-oxime.

Following the procedure of Examples 8 and 9, 17α-hydroxy-5α-pregnane-11,20-dione was converted to its bisoxime and then hydrolyzed to 17α-hydroxy-5α-pregnane-11,20-dione 11-oxime and 21-hydroxy-5α-pregnane-11,20-dione was converted to its bisoxime and then hydrolyzed to 21-hydroxy-5α-pregnane-11,20-dione 11-oximidoacetate-21-acetate was prepared with acetic anhydride in pyridine at room temperature. Partial hydrolysis with boron trifluoride in methanol gave the 21-monoacetate.

EXAMPLE 10
3α-Hydroxy-5β-Androstane-11,17-Dione Bisoxime

A mixture of 1 g. of 3α-hydroxy-5β-androstane-11,17-dione and 1 g. of hydroxylamine hydrochloride and 3 ml. of pyridine was warmed on the steam bath for 3 hours. Dilution of the cooled solution with water gave a semi-solid gum. The gum was dissolved in ether, washed with water, dried and then precipitated by the addition of hexanes to give a precipitate consisting essentially of 3α-hydroxy-5β-androstane-11,17-dione bisoxime. Further purification was achieved by chromatography over aluminum oxide.

EXAMPLE 11
3α-Hydroxy-5β-Androstane-11,17-Dione 11-Oxime

A mixture of 500 mg. of 3α-hydroxy-5β-androstane-11,17-dione bisoxime, 10 ml. of acetic acid, 4 ml. of water and 0.8 ml. of pyruvic acid was stirred with warming on a steam bath under nitrogen for 15 minutes. 4 ml. of water was added and the mixture was gently heated for a total of 3 hours. The cooled reaction mixture was diluted with 20 ml. of water. The resulting precipitate was separated by filtration, washed with water and dried to give 3α-hydroxy-5β-androstane-11,17-dione 11-oxime. The 3-acetate-11-oximidoacetate was prepared with acetic anhydride and pyridine. Partial hydrolysis in methanol in the presence of boron trifluoride gave the 3-monoacetate.

EXAMPLE 12
17α-Methyl-17β-Hydroxy-4-Androstene-3,11-Dione 11-Oxime

Following the procedures of Examples 10 and 11, 17α-methyl-17β-hydroxy-4-androstene-3,11-dione was converted to 17α-methyl-17β-hydroxy-4-androstene-3,11-dione 11,20-bisoxime and then converted to the 11-mono-oxime.

solution of 1.2 ml. of benzylmercaptan and 7 drops of boron trifluoride etherate in 7.5 ml. of methanol. The mixture was refluxed for one hour during which time the methylene chloride was allowed to evaporate. The mixture was chilled and seeded to produce a precipitate of 3-benzylthioenol ether of 5β-pregnane-3,11,20-trione.

36 g. of freshly prepared W-4 Raney nickel was suspended in 500 ml. of acetone and refluxed for one hour. Then the thioenol ether obtained as described above was added and the mixture was refluxed for 4 more hours. The catalyst was removed by filtration and the filtrate was evaporated to dryness at reduced pressure. The residual Δ$^3$-5β-pregnene 11,20-dione was dissolved in 100 ml. of ethyl acetate and shaken under a hydrogen atmosphere in the presence of 5 percent palladium on charcoal. The catalyst was removed by filtration when the hydrogenation was complete and the filtrate was evaporated to dryness. The residual 5β-pregnane-11,20-dione was redissolved in methylene chloride and purified by chromatography through a magnesium silicate (Florisil) column. The column was eluted with hexanes (Skellysolve B) containing increasing amounts of acetone. There was thus eluted substantially pure 5β-pregnane-11,20-dione.

PREPARATION 7

*17α-Hydroxy-5α-Pregnane-11,20-Dione*

Following the procedure of Romo et al., J. Am. Chem. Soc., 73, 1528 (1951), 1.5 g. of 11-keto-17α-hydroxyprogesterone was converted to its 3-benzylthioenol ether and then hydrogenated with freshly prepared W-4 Raney nickel, partially deactivated by refluxing for one hour in 250 ml. of acetone, by refluxing for 4 hours in the same mixture to produce 17α-hydroxy-3,5-pregnadiene-11,20-dione. Hydrogenation of 1 g. of this compound in 100 ml. of ethyl acetate containing 0.5 g. of 5 percent palladium on charcoal until the theoretical amount of hydrogen had been adsorbed produced a solution of 17α-hydroxy-5α-pregnane-11,20-dione which was filtered and the solvent evaporated from the filtrate to give a solid residue of the desired product.

Similarly, 11-keto-21-hydroxyprogesterone was converted to 21-hydroxy-5α-pregnane-11,20-dione.

EXAMPLE 1

*11-Ketoprogesterone Trisoxime*

A solution of 3 g. of 11-ketoprogesterone 3,20-bis(ethylene ketal) and 12 g. of hydroxylamine hydrochloride in 100 ml. of pyridine was refluxed for 7.5 hours and then evaporated at reduced pressure. A pale yellow glass which turned to a semi-solid gum upon the addition of water was obtained. Upon addition of ether, the gum solidified to 1.3 g. of 11-ketoprogesterone trisoxime which darkened at 220°, blackened at 275° and remained unmelted at 335° C. A sample precipitated from dimethylformamide by the addition of water had an [α]$_D$ of +325° (dimethylformamide), $\lambda_{max}^{alc.}$ 240 mμ, $a_M$ 19,525, ν max. 1698, 1664, 1640, 1610, 3400, 3320, 3100 cm.$^{-1}$ and the analysis below.

Calcd. for $C_{21}H_{31}N_3O_3$: C, 67.51; H, 8.37; N, 11.25. Found: C, 67.85; H, 8.40; N, 11.02.

A better yield of the trisoxime was obtained by substituting 11-ketoprogesterone for its 3,20-bis(ethylene ketal) and refluxing the pyridine solution for 15 hours.

EXAMPLE 2

*11-Ketoprogesterone 11-Oxime*

A suspension of 3 g. of 11-ketoprogesterone trisoxime in 50 ml. of acetic acid, 25 ml. of water and 4 ml. of pyruvic acid was stirred with warming on a steam bath under nitrogen for 15 minutes. Another 25 ml. of water was then added. A solution was obtained after 40 minutes. Gentle heating was continued for a total of 3 hours. The reaction mixture was cooled and diluted with 100 ml. of water. The resulting precipitate was collected on a filter, washed with water and dried. There was thus obtained 1 g. of crystalline 11-ketoprogesterone 11-oxime melting at 241–258° C. Recrystallization from a mixture of methylene chloride and methanol gave purified product having a $\lambda_{max}$. 239, $a_M$=16,450 and an infrared spectrum consistent with its structure. The 11-acetate was prepared with acetic anhydride in pyridine at room temperature.

EXAMPLE 3

*5β-Pregnane-3,11,20-Trione Trisoxime*

A solution of 20 g. of 5β-pregnane-3,11,20-trione and 40 g. of hydroxylamine hydrochloride in 100 ml. of pyridine was heated at 95° C. for 2 hours. An additional 50 ml. of pyridine was added and the solution was boiled under nitrogen for 2.5 more hours. The cooled solution was poured into ice-water, the precipitate collected, washed with water and dried to give, after crystallization from acetone, 5β-pregnane-3,11,20-trione trisoxime in 78 percent yield which melted at 273–276° C. (dec.) and had the analysis below.

Calcd. for $C_{21}H_{33}N_3O_3$: C, 67.17; H, 8.86; N, 11.19. Found: C, 67.23; H, 8.88; N, 10.70.

Following the procedure of Example 3, 3α,17α-dihydroxy-5α-pregnane-11,20-dione 3-acetate was converted to 3α,17α-dihydroxy-5α-pregnane-11,20-dione 3-acetate, 11,20- bisoxime. A solution of this compound in aqueous acetic acid, containing an excess of pyruvic acid was maintained under nitrogen on the steam bath for one-half hour to produce 3α, 17α-dihydroxy-5α-pregnane 11,20-dione 3-acetate, 11-oxime. Hydrolysis of this compound with dilute sodium hydroxide in methanol produces 3α,17α-dihydroxy-5α-pregnane-11,20-dione 11-oxime which, when reacted with acetic anhydride in pyridine, is converted to 3α,17α-dihydroxy-5α-pregnane-11,20-dione 3-acetate, 11-oximidoacetate. Mild hydrolysis with boron trifluoride in methanol produces 3α,17α-dihydroxy-5α-pregnane-11,20-dione 3-acetate, 11-oxime.

EXAMPLE 4

*5α-Pregnane-3,11,20-Trione 11-Oxime*

Following the procedure of Example 2, 5α-pregnane-3,11,20-trione trisoxime was hydrolyzed to 5β-pregnane-3,11,20-trione 11-oxime. 5β-pregnane-3,11,20-trione 11-oxime is also prepared by an Oppenauer oxidation of 3α,20β-dihydroxy-5β-pregnane-11-one 11-oxime with aluminum tertiary butoxide and cyclehexanone under the usual conditions.

Following the procedure of Examples 1 and 2, 17α-hydroxy-5β-pregnane-3,11-20-trione was converted to 17α-hydroxy-5β-pregnane-3,11,20-trione trisoxime and then hydrolyzed to the 11-oxime; 21-hydroxy-5β-pregnane-3,11,20-trione was converted to 21-hydroxy-5β-pregnane-3,11,20-trione trisoxime and then hydrolyzed to the 11-oxime and 17α,21-dihydroxy-5β-pregnane-3,11,20-trione was converted to 17α,21-dihydroxy-5β-pregnane-3,11,20-trione trisoxime and then hydrolyzed to the 11-oxime. This compound was converted to the 11,21-diacetate with acetic anhydride in pyridine. Partial hydrolysis with boron trifluoride in methanol gave the 21-monoacetate.

EXAMPLE 5

*3β,17α,21-Trihydroxy-5α-Pregnane-11,20-Dione Bisoxime*

Following the procedure of Examples 1 and 2, 3β,17α,21 - trihydroxy-5α-pregnane-11,20-dione was converted to 3β,17α,21-trihydroxy-5α-pregnane-11,20-dione bisoxime and then hydrolyzed to the 11-oxime.

Similarly, 3α,17α,21-trihydroxy-5β - pregnane - 11,20-dione was converted to 3α,17α,21-trihydroxy-5β-pregnane-11,20-dione bisoxime and then hydrolyzed to the 11-oxime, 3α,21-dihydroxy-5β-pregnane - 11,20 - dione was converted to the bisoxime and then hydrolyzed to the 11-mono-oxime and 3α-hydroxy-5β-pregnane-11,20-dione

EXAMPLE 13

4-Androstene-3,11,17-Trione 11-Oxime

Following the procedure of Examples 10 and 11, 4-androstene-3,11,17-trione was converted to 4-androstene-3,11,17-trione 3,11,17-trisoxime and then converted to the 11-mono-oxime.

Following the procedure of Examples 10 and 11, 11-ketotestosterone was converted to 11-ketotestosterone bisoxime and then hydrolyzed to 11-ketotestosterone 11-oxime.

Similarly, he following compounds were converted to polyoximes by reaction with a large molar excess of hydroxylamine hydrochloride and then hydrolyzed with pyruvic acid to the corresponding 11-oximes: 17β-hydroxy-5β-androstane-3,11-dione, 17β-hydroxy-5α-androstane-3,11-dione, 17β-hydroxy-17α-methyl-5β-androstane-3,11-dione, 17β-hydroxy-17α-methyl-5α-androstane-3,11-dione, and 5α-androstane-3,11,17-trione, 3β-hydroxy-5α-androstane-11,17-dione.

EXAMPLE 14

3β,17β-Dihydroxy-17α-Methyl-5-Androsten-11-One Oxime

Following the procedure of Example 10, but substituting 3β,17β-dihydroxy-17α-methyl-5-androsten-11-one (S.N. 640,090) as the starting steroid, there was thus produced 3β,17β-dihydroxy-17α-methyl-5-androsten-11-one oxime.

EXAMPLE 15

3β,17β-Dihydroxy-17α-Methyl-5αAndrostan-11-One Oxime

Following the procedure of Example 10, but substituting 3β,17β-dihydroxy-17α-methyl-5α-androstan-11-one as the starting steroid there was thus produced 3β, 17β-dihydroxy-17α-methyl-5α-androstan-11-one oxime.

Similarly, 3β, 17β-dihydroxy-5α-androstan-11-one was converted to 3β,17β-dihydroxy-5α-androstan-11-one oxime.

EXAMPLE 16

17β-Hydroxy-5α-Androstan-11-One Oxime

A solution of 0.5 g. of 17β-hydroxy-5α-androstan-11-one (S.N. 523,390) and 2 g. of hydroxylamine hydrochloride in 15 ml. of pyridine was refluxed for 5 hours. Upon cooling, 0.5 g. of 17β-hydroxy-5α-androstan-11-one oxime was obtained which melted partially at 159.4° C., resolidified as plates and then remelted at 190–191° C. Recrystallization from a mixture of ether and hexanes gave 17β-hydroxy-5α-androstan-11-one oxime melting at 163–165° C., having a $\nu_{max.}$ 3320, 1655, an $[\alpha]_D$ of +98° (dimethylformamide) and the analysis below.

Calcd. for $C_{19}H_{31}NO_2$: C, 74.70; H, 10.23; N, 4.59. Found: C, 74.90; H, 10.34; N, 4.53.

The diacetate melts, after recrystallization from dilute methanol, at 105–107° C.

EXAMPLE 17

5α-Androstane-11,17-Dione Bisoxime

A solution of 1 g. of 5α-androstane-11,17-dione (S.N. 523,390) and 4 g. of hydroxylamine hydrochloride in 50 ml. of ethanol was mixed with a solution of 6.2 g. of potassium hydroxide in 10 ml. of water and then refluxed for 7 minutes followed by heating at 65–75° C. for 2 hours. Water was added causing the suspended solid to dissolve. A flocculent precipitate formed upon the addition of 6 ml. of glacial acetic acid. The solution was chilled and the resulting precipitate separated by filtration to give 1.02 g. of 5α-androstane-11,17-dione bisoxime melting at 224–236° C. with sublimation at 210° C. The sublimed needles melted at 240–242° C. A sample recrystallized from a mixture of ether and hexanes melted at 250–256° C., had an $[\alpha]_D$ of +53° (acetone) $\nu_{max.}^{Nujol}$ 3120, 1687 and 1645 cm.$^{-1}$ and the analysis below.

Calcd. for $C_{19}H_{30}N_2O_2$: C, 71.66; H, 9.50; N, 8.80. Found: C, 71.79; H, 9.80; N. 8.41.

A sample was prepared by the reaction of 5α-androstane-11,17-dione with hydroxylamine hydrochloride in pyridine for 2 hours on a steam bath followed by dilution with water. Recrystallization in the manner described above gave crystals melting at 252–256° C. The diacetate melts, after crystallization from methanol, at 155–160° C.

EXAMPLE 18

5α-Androstane-11,17-Dione 11-Oxime

A mixture of 1 g. of 5α-androstane-11,17-dione bisoxime, 16 ml. of acetic acid, 8 ml. of water and 1.5 ml. of pyruvic acid was stirred with warming on a steam bath under nitrogen for 15 minutes. Another 8 ml. of water was added and gentle heating was continued for a total of 3 hours. The reaction mixture was cooled and diluted with 35 ml. of water. The resulting precipitate was separated by filtration, washed with water and dried to give 5α-androstane-11,17-dione 11-oxime.

11β-Amino-17β-Hydroxy-5α-Androstane 270 mg. of 17β-hydroxy-5α-androstan-11-one 11-oxime in 6 ml. of tetrahydrofuran was added with stirring to 47 mg. of lithium aluminum hydride in 40 ml. of tetrahydrofuran. The mixture was refluxed for 24 hours and then the excess lithium aluminum hydride was decomposed with water. Enough 2.5 N hydrochloric acid was then added to produce a clear solution which was then concentrated under vacuum to about ½ volume. The concentrate was extracted thoroughly with ether which was then washed with water, dried, concentrated to a small volume and then diluted with hexanes (Skellysolve B) to produce 200 mg. of crystals of starting oxime melting at 162–168° C. An additional 30 mg. was obtained from the mother liquors.

The acidic aqueous solution obtained above was made basic with 10 percent aqueous sodium hydroxide, diluted with ether and filtered. The filter cake was washed thoroughly with ether. The ether filtrate and washings were combined with the aqueous filtrate etxracted throughly with ether. The combined ether solutions were washed with water, dried and concentrated to a small volume to give 11β-amino-17β-hydroxy-5α-androstane having infrared absorption bands at 3260 and 1643 cm.$^{-1}$.

The same reaction product is obtained when the starting oxime is reduced with platinum oxide in glacial acetic acid, preferably containing a small amount of concentrated hydrochloric acid.

11α-Amino-17β-Hydroxy-5α-Androstane

To a solution of 20 g. of 17β-hydroxy-5α-androstan-11-one 11-oxime in 50 ml. of n-hexanol was added, in small portions and with vigorous stirring, 5 g. of sodium. The solution was heated to 155° C. After 2 hours, the viscous mass was cooled, diluted with ether and washed four times with water and then eight times with 2.5 N hydrochloric acid. The acid washes were made basic with 10 percent aqueous sodium hydroxide and the alkaline mixture was extracted thoroughly with chloroform. The chloroform washes were washed with brine, dried and then evaporated to dryness to give 11α-amino-17β-hydroxy-5α-androstane as a white solid. Recrystallization of this product from a mixture of methylene chloride and ether and then from hexanes (Skellysolve B) gave crystals melting at 179–184° C., having an $[\alpha]_D$ of +24° (CHCl$_3$), a $\nu_{max.}$ 3200, 1630, 1600, 1572, 1120, 1052, 1032 cm.$^{-1}$ and the analysis below.

Calcd. for $C_{19}H_{32}NO$: C, 78.56; H, 11.11; N, 4.82. Found: C, 78.33; H, 11.37; N, 4.87.

11α-amino-17β-hydroxy-5α-androstane was converted with 2.5 N aqueous hydrochloric acid to its hydrochloride acid addition salt which crystallized from the aqueous solution as rectangular plates melting at 285–300° C. (dec.).

11α-amino-17β-hydroxy-5α-androstane is also produced from an ether solution of the above oxime with lithium in liquid ammonia, worked up in the usual manner.

We claim:
1. 5β-pregnane-3,11,20-trione 11-oxime.
2. 11-ketoprogesterone 11-oxime.
3. Cortisone 11-oxime.
4. A compound represented by the formula:

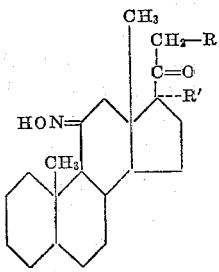

wherein R is selected from the group consisting of hydrogen, hydroxy and lower-acyloxy and R′ is selected from the group consisting of hydrogen and hydroxy, wherein acyl is the acyl radical of a hydrocarbon carboxylic acid containing from 1 to 12 carbon atoms, inclusive.
5. Pregnane-11,20-dione 11-oxime.
6. 5α-pregnane-11,20-dione 11-oxime.
7. A compound represented by the formula:

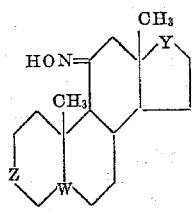

wherein W is selected from the group consisting of single and double bonded $C_5$-carbon atoms, Y is selected from the group consisting of carbonyl, β-hydroxymethylene, β-acyloxymethylene, β-hydroxy-α-methylmethylene and β-acyloxy-α-methylmethylene, and Z is selected from the group consisting of carbonyl, hydroxymethylene, and acyloxymethylene, wherein in each instance acyl is the acyl radical of a hydrocarbon carboxylic acid containing from 1 to 12 carbon atoms, inclusive.
8. 17α-methyl-17β-hydroxy-4-androstene-3,11-dione 11-oxime.
9. 4-androstene-3,11,17-trione 11-oxime.
10. A compound represented by the formula:

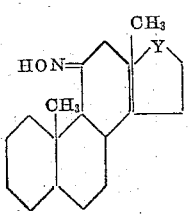

wherein Y is selected from the group consisting of carbonyl β-hydroxymethylene, β-acyloxymethylene, β-hydroxy-α-methylmethylene and β-acyloxy-α-methylmethylene wherein the acyl radical in each instance is that of a hydrocarbon carboxylic acid containing from 1 to 12 carbon atoms, inclusive.
11. 17β-hydroxy-5α-androstan-11-one 11-oxime.
12. 5α-androstane-11,17-dione 11-oxime.
13. A process for the production of the 11-oxime of an 11-ketopolyketo steroid which comprises the steps of (1) heating in a nonacidic solvent at a temperature substantially above room temperature, an 11-keto steroid represented by the formula:

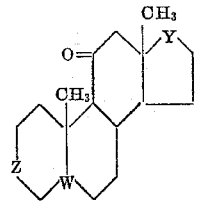

wherein Z is selected from the group consisting of methylene, carbonyl, hydroxymethylene and acyloxymethylene; W is selected from the group consisting of single and double bonded $C_5$-carbon atoms; and Y is selected from the group consisting of carbonyl, β-hydroxymethylene, β-acyloxymethylene, β-hydroxy-α-methylmethylene, β-acyloxy-α-methylmethylene and $$C-CO-CH_2-R$$
   $\diagdown R'$ wherein R is selected from the group consisting of hydrogen, hydroxy and acyloxy and R′ is selected from the group consisting of hydrogen and hydroxy, acyl in each instance being the acyl radical of a hydrocarbon carboxylic acid containing from one to twelve carbon atoms, inclusive, at least one of Y and Z being carbonyl, with at least a chemical equivalent of a compound selected from the group consisting of hydroxylamine and acid addition salts thereof at a temperature from about 80° C. to the refluxing temperature of the mixture for at least several hours, to produce a polyoximido-11-oxime, and (2) converting the thus-produced polyoxime to an 11-mono-oxime by reaction with an active carbonyl compound selected from the group consisting of pyruvic acid, pyruvaldehyde, glyoxal, glyoxalic acid, diacetyl, benzaldehyde, phenylglyoxalic acid, formalin and p-aminobenzaldehyde until a steroidal ketone is produced.
14. The process of claim 13 wherein the reaction of step (1) is conducted in pyridine and a substantial excess of hydroxylamine hydrochloride is employed and the active carbonyl compound in step (2) is pyruvaldehyde.
15. The process of claim 13 wherein the reaction of step (1) is conducted in pyridine.
16. The process of claim 13 wherein the reaction of step (1) is conducted in pyridine and a substantial excess of hydroxylamine hydrochloride is employed.
17. 3β,17β - dihydroxy-17α-methyl-5α-androstan-11-one oxime.

References Cited in the file of this patent

UNITED STATES PATENTS

| | | |
|---|---|---|
| 2,447,463 | Hershberg | Aug. 17, 1948 |
| 2,769,020 | Hershberg et al. | Oct. 30, 1956 |
| 2,863,885 | Babcock | Dec. 9, 1958 |
| 2,982,775 | Oliveto et al. | May 2, 1961 |

OTHER REFERENCES

Hershberg et al.: Chem. & Ind., vol. 45 (Nov. 8, 1958), pp. 1477 and 1478.

UNITED STATES PATENT OFFICE
CERTIFICATE OF CORRECTION

Patent No. 3,064,013            November 13, 1962

John C. Babcock et al.

It is hereby certified that error appears in the above numbered patent requiring correction and that the said Letters Patent should read as corrected below.

Column 6, line 41, for "5α-Pregnane-", in italics, read -- 5β-Pregnane- --, in italics; line 42, for "5α-pregnane-" read -- 5β-pregnane- --; column 8, line 25, for "is" read -- its --; lines 31 and 32, for "11-oximidoacetate-21-acetate" read -- 11-oxime. The 11-oximidoacetate-21-acetate --.

Signed and sealed this 7th day of May 1963.

(SEAL)
Attest:

ERNEST W. SWIDER            DAVID L. LADD
Attesting Officer            Commissioner of Patents